United States Patent
Buckley et al.

(10) Patent No.: US 9,986,500 B2
(45) Date of Patent: *May 29, 2018

(54) APPARATUS, AND ASSOCIATED METHOD, FOR FACILITATING WLAN SELECTION BY A MOBILE NODE

(71) Applicant: BLACKBERRY LIMITED, Waterloo (CA)

(72) Inventors: Adrian Buckley, Tracy, CA (US); George Baldwin Bumiller, Ramsey, NJ (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/723,441

(22) Filed: Oct. 3, 2017

(65) Prior Publication Data

US 2018/0027489 A1    Jan. 25, 2018

Related U.S. Application Data

(63) Continuation of application No. 14/736,948, filed on Jun. 11, 2015, now Pat. No. 9,781,665, which is a continuation of application No. 13/089,166, filed on Apr. 18, 2011, now Pat. No. 9,072,037, which is a continuation of application No. 11/853,230, filed on
(Continued)

(51) Int. Cl.
| | | |
|---|---|---|
| H04W 48/18 | (2009.01) | |
| H04W 48/16 | (2009.01) | |
| H04W 4/02 | (2018.01) | |
| H04W 48/10 | (2009.01) | |

(52) U.S. Cl.
CPC .......... *H04W 48/18* (2013.01); *H04W 4/021* (2013.01); *H04W 48/16* (2013.01); *H04W 48/10* (2013.01)

(58) Field of Classification Search
None
See application file for complete search history.

(56) References Cited

U.S. PATENT DOCUMENTS

| 5,649,301 A | 7/1997 | Yabusaki et al. |
| 5,761,618 A | 6/1998 | Lynch et al. |
(Continued)

FOREIGN PATENT DOCUMENTS

| JP | 2003-209870 A | 7/2003 |
| JP | 2003-259457 A | 9/2003 |
(Continued)

OTHER PUBLICATIONS

European Patent Office, Extended European Search Report and Opinion for EP Appl. No. 10184883.6 dated Dec. 7, 2010 (8 pages).
(Continued)

*Primary Examiner* — Kouroush Mohebbi
(74) *Attorney, Agent, or Firm* — Trop, Pruner & Hu, P.C.

(57) ABSTRACT

Apparatus, and an associated method, by which to facilitate selection of a WLAN through which a mobile node communicates. Selection takes into account the geographic positioning of the mobile node. The mobile node ascertains its geographic positioning by monitoring cellular-positioning signals. And, availability of WLANs through which to communicate is ascertained by detecting signals broadcast by the WLANs.

20 Claims, 4 Drawing Sheets

Related U.S. Application Data

Sep. 11, 2007, now Pat. No. 7,929,967, which is a continuation of application No. 10/840,190, filed on May 6, 2004, now Pat. No. 7,283,507.

(56) References Cited

U.S. PATENT DOCUMENTS

| | | | |
|---|---|---|---|
| 5,903,832 A | 5/1999 | Seppanen et al. | |
| 5,946,634 A * | 8/1999 | Korpela | H04W 8/245 |
| | | | 370/466 |
| 5,950,130 A | 9/1999 | Coursey | |
| 6,408,173 B1 | 6/2002 | Bertrand et al. | |
| 6,625,451 B1 | 9/2003 | La Medica, Jr. et al. | |
| 6,704,574 B2 | 3/2004 | Lin | |
| 6,771,955 B2 | 8/2004 | Imura et al. | |
| 6,847,823 B2 | 1/2005 | Lehikoinen et al. | |
| 6,990,344 B1 | 1/2006 | Dolan et al. | |
| 7,171,216 B1 | 1/2007 | Choksi | |
| 7,188,026 B2 | 3/2007 | Tzamaloukas | |
| 7,295,540 B2 | 11/2007 | Joong et al. | |
| 7,315,740 B2 | 1/2008 | Maes | |
| 7,352,733 B2 | 4/2008 | Green | |
| 7,389,109 B2 | 6/2008 | Hind et al. | |
| 7,433,929 B2 | 10/2008 | Guilford et al. | |
| 7,505,433 B2 | 3/2009 | Yaqub et al. | |
| 7,590,708 B2 | 9/2009 | Hsu | |
| 7,650,428 B1 | 1/2010 | Taaghol et al. | |
| 7,778,641 B1 | 8/2010 | Willars et al. | |
| 7,925,762 B1 | 4/2011 | Kauppinen et al. | |
| 7,929,967 B2 * | 4/2011 | Buckley | H04W 48/16 |
| | | | 370/328 |
| 9,072,037 B2 * | 6/2015 | Buckley | H04W 48/18 |
| 2002/0147008 A1 | 10/2002 | Kallio | |
| 2002/0168976 A1 | 11/2002 | Krishnan | |
| 2002/0187780 A1 | 12/2002 | Souissi | |
| 2003/0118015 A1 | 6/2003 | Gunnarsson et al. | |
| 2003/0142641 A1 | 7/2003 | Sumner et al. | |
| 2004/0066756 A1 * | 4/2004 | Ahmavaara | H04W 48/18 |
| | | | 370/328 |
| 2004/0082327 A1 | 4/2004 | Kim et al. | |
| 2004/0156372 A1 | 8/2004 | Hussa | |
| 2004/0176024 A1 | 9/2004 | Hsu et al. | |
| 2004/0192211 A1 | 9/2004 | Gallagher et al. | |
| 2004/0264410 A1 | 12/2004 | Sagi et al. | |
| 2004/0266428 A1 | 12/2004 | Aaltonen | |
| 2004/0266436 A1 | 12/2004 | Jaakkola et al. | |
| 2005/0130661 A1 | 6/2005 | Aerrabotu et al. | |
| 2005/0143088 A1 | 6/2005 | Hirsbrunner et al. | |
| 2005/0215268 A1 | 9/2005 | Cheng | |
| 2005/0239463 A1 | 10/2005 | Lagnado | |
| 2006/0040661 A1 | 2/2006 | Choi et al. | |
| 2006/0111107 A1 | 5/2006 | Zhang | |
| 2006/0199580 A1 | 9/2006 | Zhang | |
| 2006/0234725 A1 | 10/2006 | Litwin | |
| 2011/0003594 A1 | 1/2011 | Cooper | |

FOREIGN PATENT DOCUMENTS

| | | |
|---|---|---|
| WO | 01/62034 A1 | 8/2001 |
| WO | 02/103459 A2 | 12/2002 |
| WO | 03/058996 | 7/2003 |
| WO | 03/081828 A2 | 10/2003 |
| WO | 03/090013 A2 | 10/2003 |
| WO | 2004/034714 A1 | 4/2004 |

OTHER PUBLICATIONS

European Patent Office, Summons to Attend Oral Proceedings pursuant to Rule 115(1) EPC for EP Appl. No. 10184883.6 dated Mar. 16, 2016 (3 pages).

* cited by examiner

APPARATUS, AND ASSOCIATED METHOD, FOR FACILITATING WLAN SELECTION BY A MOBILE NODE

CROSS-REFERENCE OF RELATED APPLICATION

The present application is a continuation of U.S. patent application Ser. No. 14/736,948, filed Jun. 11, 2015, now U.S. Pat. No. 9,781,665, which is a continuation of U.S. patent application Ser. No. 13/089,166, filed Apr. 18, 2011, which is a continuation of U.S. patent application Ser. No. 11/853,230, filed Sep. 11, 2007, now U.S. Pat. No. 7,929,967, which is a continuation of U.S. patent application Ser. No. 10/840,190, filed May 6, 2004, now U.S. Pat. No. 7,283,507, the contents of all of which are incorporated herein by reference.

The present invention relates generally to a manner by which to select a WLAN (Wireless Local Area Network) through which a mobile node, operable to communicate both by way of a WLAN and by way of a cellular communication network, shall become associated with the WLAN to communicate data pursuant to a communication session. More particularly, the present invention relates to apparatus, and an associated method, by which to select the WLAN based upon a preference order. The preference order is position-dependent, that is to say, dependent upon the location at which the mobile node is positioned. The position of the mobile node is determined from information, e.g., country-code information, broadcast to the mobile node by a cellular network. And, the information is used by the mobile node to select the WLAN.

Positioning information is provided to the mobile node to permit WLAN selection based upon the position-dependent preference order, even though positioning information is not provided by signals broadcast by the WLANs. Position-dependent preferences are used in the WLAN selection without need to make any changes to conventional signaling protocols used by conventional WLANs, such as those defined in an IEEE 802.11 operating protocol.

BACKGROUND OF THE INVENTION

The availability of modern communication systems through which to communicate data is a practical necessity of modern society. Communication systems are available for use to effectuate many different types of communication services in which data is communicated between sets of communication stations to effectuate desired communication services.

Existing communication systems incorporate advancements in communication technologies. And, new communication systems are made available as a result of advancements in communication technologies. Generally, advancements in communication technologies improve the efficiencies of communication of data, permit the data to be communicated at higher through-put rates, or provide better for the communication of the data in non-ideal communication conditions. Digital communication techniques, and improvements associated therewith, are amongst the communication technologies that provide such communication advantages.

A radio communication system is an exemplary type of communication system. Many modern radio communication systems employ the use of digital communication techniques. A cellular communication system is a type of radio communication system. Network infrastructures of cellular communication systems have been installed over significant portions of the populated areas of the world, and usage of cellular communication systems through which to communicate telephonically, already popular, is increasing as additional communication services are increasingly able to be effectuated by way of such systems.

The network infrastructure of an exemplary cellular communication system generally includes a plurality of spaced-apart base transceiver stations that provide for communications with mobile stations. The mobile stations form portable radio transceivers, and the base transceiver stations each define coverage areas referred to as cells. When a mobile station is positioned within the coverage area of a particular base transceiver station, the mobile station is generally capable of communicating with the base transceiver station in whose coverage area that the mobile station is positioned. The mobile station is provided with mobility and the mobile station is permitted movement between cells defined by different ones of the base transceiver stations. Communication handovers permit continued communications by the mobile station with the network infrastructure as the mobile station travels between the cells.

Analogous types of radio communication systems that exhibit certain of the characteristics of cellular communication systems have been developed and deployed. So-called micro-cellular networks, private networks, and WLANs (Wireless Local Area Networks) are representative of radio communication systems that are operable, at least in various aspects, in manners that are analogous to the operation of a cellular communication system. Wireless local area networks, for instance, are technological extensions of conventional local area networks. That is to say, conventional local area networks, such as those that form computer networks and wireless local area networks, generally provide for the communication of packet-formatted data. A mobile node that is operable in, and forms a portion of, a wireless local area network system, is analogous to, and is sometimes functionally equivalent to, the fixed nodes of a local area network. And, analogous to conventional local area networks, wireless local area networks are constructed to permit effectuation of data-intensive communication services.

Wireless local area networks are generally constructed to communicate data pursuant to an operating protocol, such as any of the IEEE 802.11(a), (b), (g), and (n) operating protocols. A commercial 2.4 GHz frequency band is allocated for WLAN communications, and an unregulated band in the 5 GHz frequency range is also usable by WLAN systems.

The mobile nodes operable in the wireless local area networks are sometimes constructed to monitor selected frequencies within the allocated frequency bands to detect for the presence of a WLAN within communication range of the mobile node. Access points, or other network elements, of the WLAN broadcast signals that are detectable by the mobile nodes, when the mobile nodes are within the coverage areas of the WLAN. The signals broadcast by the WLAN and monitored by the mobile nodes typically include an SSID (Service Set Identifier) value that identifies the WLAN that broadcasts the signal.

More than one WLAN might be installed to provide coverage over a partially, or fully, overlapping coverage area. When a mobile node is positioned at a location encompassed by more than one WLAN, the mobile node might be capable of operation to communicate with any of the more than one WLAN. A decision is made as to which of the WLANs that the mobile node shall attempt to communicate. There is generally a preference to communicate by way of a certain WLAN of the available WLANs.

The preference order of the WLANs, with respect to a particular mobile node, is location dependent. That is to say, the preference order of the WLANs, with respect to the mobile node, is dependent also upon the location at which the mobile node is positioned. The determination at the mobile node with which of the WLANs that the mobile node shall attempt to communicate is complicated as the broadcast signals broadcast by the WLANs do not identify the locations of the WLANs. Only the SSIDs are broadcast. And, the SSIDs are not necessarily unique to a particular WLAN.

For instance, a plurality of WLANs, operated by a single operator, are sometimes identified by a single SSID value. And, different ones of the WLANs operated by the operator might be located at widely disparate locations. The relative preference of a mobile node to communicate with a WLAN, identified by an SSID, might well be different, depending upon the location with which the mobile node is positioned when the communicates are to be effectuated. When the mobile node is positioned in one location, for instance, the WLAN, identified by the SSID value, might have a first level of preference. But, when the mobile node is positioned at another location, a WLAN identified by the same SSID value might well have a different level of preference associated therewith.

Therefore, a single list that identifies, in order of preference, WLANs, identified by SSID values, is an inadequate manner by which to identify through which of the WLANs that a mobile node should attempt to communicate when communications are to be effectuated.

It is in light of this background information related to communications between a mobile node and a WLAN that the significant improvements of the present invention have evolved.

SUMMARY OF THE INVENTION

The present invention, accordingly, advantageously provides apparatus, and an associated method, by which to select a network, such as a WLAN of a multiple-network radio communication system, with which a multi-mode-capable mobile node communicates data during a communication session.

Through operation of an embodiment of the present invention, a manner is provided by which to select the network responsive both to network availability and a preference order. The preference order is dependent upon the location at which the mobile node is positioned when the WLAN is to be selected. That is to say, the preference order is position-dependent.

The position of the mobile node is determined at the mobile node responsive to information, e.g., country code and optionally network code information, that is broadcast to the mobile node by a cellular communication network. Once delivered to the mobile node, the information is used by the mobile node to select which WLAN through which to attempt to communicate. The position information is provided to the mobile node to permit the WLAN selection based upon the position-dependent preference, even though position information is not broadcast by WLANs to the mobile node.

Thereby, position-dependent preferences are used by the mobile node pursuant to WLAN selection, all without need to make any changes to the conventional signaling protocols used by conventional WLANs, such as those defined in an IEEE 802.11 operating protocol.

In one aspect of the present invention, a multi-mode mobile node is operable to communicate both by way of a cellular communication system and by way of a WLAN. The mobile node monitors cellular-system signals broadcast by the network infrastructures of cellular communication systems in whose coverage area or areas that the mobile node is located when WLAN selection is to be made. The signals broadcast by the network infrastructures of the cellular communication systems include country code and network code designations that provide geographical indications of the network infrastructures from which the signals are broadcast. And, such indications also identify the geographical area at which the mobile node, positioned to receive the broadcast signals, is positioned. Thereby, the mobile node ascertains positioning information associated with its location, and the information is used pursuant to selection of with which WLAN that the mobile node shall attempt to communicate.

If a cellular communication system is unavailable to provide the country code designation, or other geographic positioning information, GPS (Global Positioning System) information or user entry of the geographic positioning indicia e.g. zip code, post code etc is alternately utilized to provide the mobile node with the indications of the geographic positioning of the mobile node. A GPS receiver, for instance, is embodied together with the circuitry of the mobile node to provide the GPS information to be used by the mobile node pursuant to WLAN selection.

In another aspect of the present invention, one or more WLAN lists are maintained at the mobile node. A WLAN list is formed of entries that identify WLANs together with their associated country code, or other geographic positioning indicia, with which the mobile node is permitted to communicate. In one implementation, the mobile node maintains three types of lists, a home list, a preferred list, and a neutral list. The preferred list may be duplicated many times, one preferred list per country. That is to say, separate preferred, and neutral, lists are maintained in one implementation, for each country code or geographic area. And, in one implementation, there is a single home list, single preferred list and a single neutral list, with the country code following each WLAN. Here, the home list does not need the country code, since home network is home network. The home network, if desired, is further split into "home-owned" and "home-connected".

The preferred list has, for each WLAN entry, the country codes where that WLAN is in the preferred list. If the UE is in a country not listed, then that WLAN is not preferred. And, in a further implementation, for each country, the VPLMNs that that WLAN connects to in that country are further identified.

The neutral list is similar, either just having the country listed for each WLAN entry, or the country and VPLMN for each country.

WLANs are identified by their SSIDs (Service Set Identifiers). Once the geographic positioning indicia associated with the location of the mobile node, i.e., the country code designation, is ascertained, a WLAN list is accessed. The country code, or other geographic positioning indicia, ascertained by the mobile node, is compared with country codes associated with the WLANs contained in the list. And, the SSIDs of the WLANs forming the entries in the list that are indexed together with the identified country code are retrieved. A determination is made as to whether the WLANs contained in the list and associated with the designated country code are available through which to communicate. If so, a WLAN so-designated becomes the selected WLAN through which communications are attempted. If communications cannot be effectuated with the selected WLAN, another WLAN, also designated with the country code corresponding to the country code ascertained by the mobile node is selected. In an implementation in which multiple WLAN lists are maintained, the lists identify different preferences of WLANs. For instance, in one implementation, the first WLAN list forms a home list, a second list forms a preferred list, and a third list forms a neutral list. The home list is first accessed. If no WLAN can be selected from the home list, the preferred list is accessed. And, if no WLAN is available at the preferred list, the neutral list is accessed.

In a further aspect of the present invention, in the event that no WLAN is identified on the WLAN list that is associated with the ascertained country code or communications cannot be effectuated with any such identified WLAN, a preferred roaming list (PRL) used by the mobile node in operation pursuant to the cellular communication system is utilized by which to select the WLAN through which to attempt to communicate. As mentioned previously, the operator of a cellular communication system sometimes maintains associations with operators of WLANs. The preferred roaming list identifies cellular communication systems with which the mobile node is permitted to communicate. By identifying the cellular communication systems with which the mobile node is permitted to communicate, together with their preferences, a determination is further made of with which WLANs that the mobile node should communicate in the event that no available WLANs are identified on the WLAN list maintained at the mobile node.

Thereby, the mobile node selects a WLAN through which to communicate even though the WLANs do not broadcast country code information as part of their broadcast signaling.

In these and other aspects, therefore, apparatus, and an associated method, is provided for a radio communication system. The radio communication system has a mobile node that is selectably operable to communicate data with a selected network of a first group of first networks. The first networks of the first group of networks are operable pursuant to a first communication scheme. And, the radio communication system further has a second group of second networks. The second networks are operable pursuant to at least a second communication scheme. A second-network detector is embodied at the mobile node and is adapted to receive indications of second-network signals broadcast by at least selected ones of the second networks. The second network signals contain second-network indicia that identifies geographic positioning of the second networks from which the second network signals are broadcast. The second-network detector detects values of the second network indicia contained in the second-network signals. Detection of the second-network indicia is indicative also of the geographic positioning of the mobile node. A first network detector is also embodied at the mobile node. The first network detector is adapted to receive indications of first-network signals that are broadcast by at least selected ones of the first networks. The first-network signals contain first-network identifying indicia that identifies the first networks from which the first-network signals are broadcast. The first-network detector selectably detects values of the first-network identifying indicia. Detection of the first-network identifying indicia is indicative also of which of the first networks are potentially available through which to communicate. A selector is adapted to receive indications of detections made by the first network detector and indications of detections made by the second network detector. The selector selects the selected network through which to effectuate the communication of the data.

A more complete appreciation of the present invention and the scope thereof can be obtained from the accompanying drawings that are briefly summarized below, the following detailed description of the presently-preferred embodiments of the present invention, and the appended claims.

DETAILED DESCRIPTION

Figure 1:
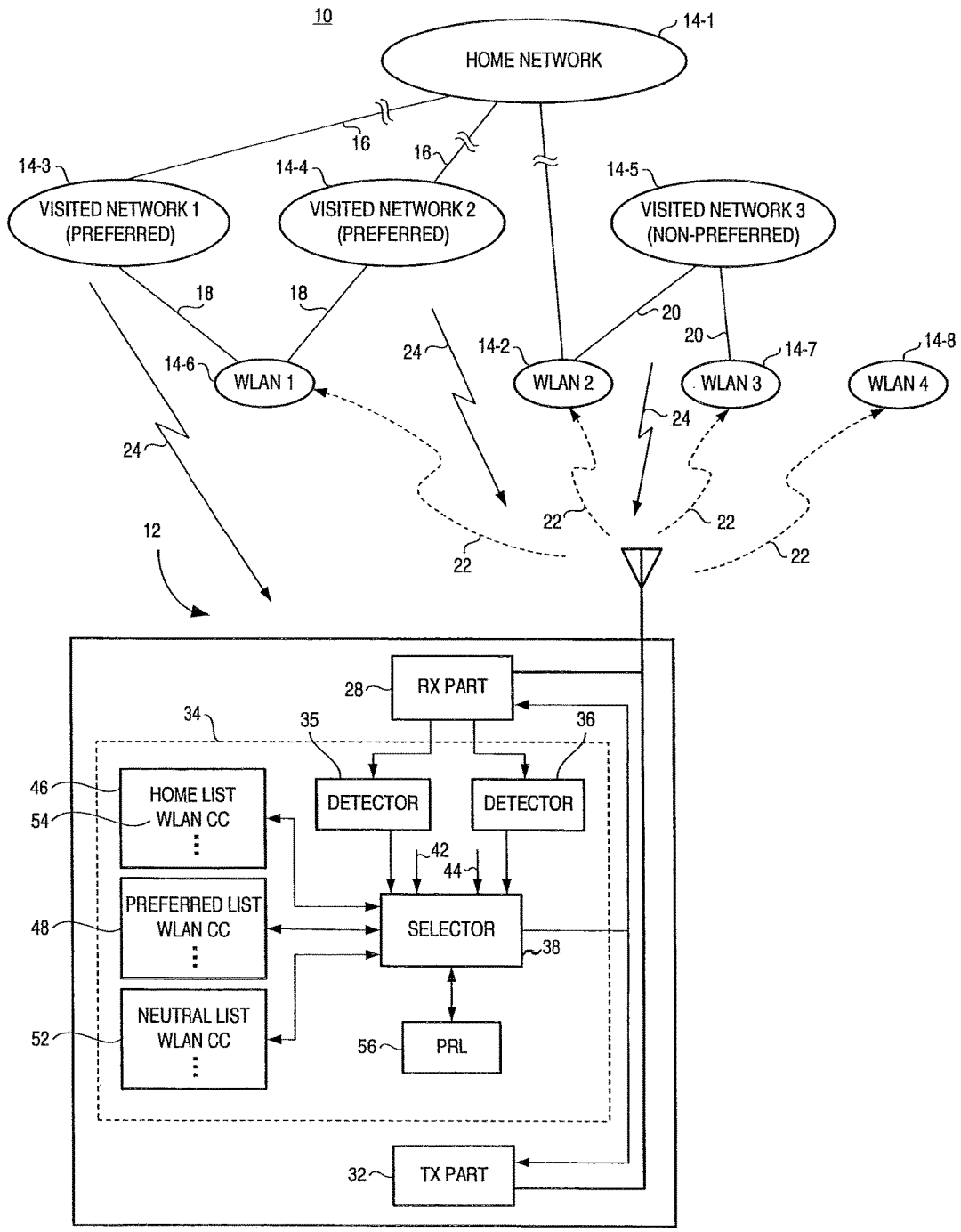
FIG. 1 illustrates a functional block diagram of a radio communication system in which an embodiment of the present invention is operable.

Referring first to FIG. 1, a radio communication system, shown generally at 10, operates to provide for the communication of data pursuant to data communication services with mobile nodes, of which the mobile node 12 is representative. Data is communicated between the mobile node and the network infrastructure by way of radio channels defined upon an appropriate radio air interface extending between the mobile node and the network infrastructure.

In the exemplary implementation, the mobile node forms at least a dual mode device. That is to say, the mobile node is separately operable pursuant to at least two separate communication schemes. Here, the mobile node is operable in a first mode to communicate generally in conformity with the operating protocols promulgated in the IEEE 802.11(b), or variant thereof, operating specification. When in this first mode, the mobile node is capable of communicating with conventional WLANs (Wireless Local Area Networks). And, the mobile node is also operable to communicate pursuant to a conventional cellular communication scheme, such as a communication scheme proposed pursuant to the 3GPP (Third Generation Partnership Project). In other implementations, the mobile node is operable pursuant to other communication schemes. For example, the IEEE 802.11(a), (g) or (n) standards or the operating protocols set forth in other cellular communication system operating specifications. Accordingly, while the description shall describe exemplary operation of the communication system in which the mobile node 12 is operable pursuant to an IEEE 802.11(b) operating specification and pursuant to a 3GPP-defined communication system, description of exemplary operation of an embodiment of the present invention can similarly be described with respect to an implementation in which the mobile node is operable to communicate pursuant to other communication standards.

The network part of the communication system includes a plurality of networks 14. The networks 14 are here designated in terms of their network definitions defined in terms of the designations used from the perspective of the mobile node 12. The identifications of the networks 14 defined in terms of their designations used by other mobile nodes might differ with the designations shown in the figure. The networks, and their interrelationships, are exemplary. And, when the mobile node is positioned at another location, the networks of the network part in whose coverage area that the mobile node is positioned would also likely be different than that shown in the figure.

The mobile node 12 is associated with a home network 14-1, a cellular communication system network that, typically, encompasses a coverage area in which the mobile node 12 is most regularly positioned. The home network 14-1 is operated by a home network operator. The home network operator that operates the home network 14-1 also operates the WLAN 14-2, here identified as WLAN2. That is to say, the same operator operates both a cellular network 14-1 and a wireless local area network, network 14-2. Further arrangements are also permitted. For instance, a WLAN could also be associated with a home network.

Three visited networks, networks 14-3, 14-4, and 14-5, are also shown in the figure. These networks are also cellular communication system networks and are representative of networks into whose coverage areas that the mobile node might roam when the mobile node roams beyond its home network. The visited network 14-3 is operated by a network operator, and the visited network 14-4 is operated by another network operator. The operator of the home network maintains associations with the operators of the visited networks 14-3 and 14-4, and the associations are represented by the lines 16 extending between the network 14-1 and the networks 14-3 and 14-4, respectively. And, an additional visited network 14-5 is further shown in the figure. The visited network also is a cellular system network. The home network operator does not maintain an association with an operator of the visited network.

The network part of the communication system additionally includes WLANs 14-6, 14-7, and 14-8. Here, in the exemplary arrangement shown in the figure, the mobile node is positioned within the coverage areas of each of the four WLANs, that is, WLANs 14-2, 14-6, 14-7, and 14-8. And, the location at which the mobile node is positioned is further encompassed by the visited networks 14-3, 14-4, and 14-5, but not the home network 14-1.

When positioned within the coverage areas of the WLANs and the visited networks, the mobile node is within reception range of signals broadcast by the respective ones of the networks. The broadcast signals, broadcast by the WLANs include the SSID (Service Set Identifier) values of the WLANs. As noted previously, the signals broadcast by the WLANs do not identify geographic positioning of the networks. However, the cellular system networks broadcast country codes that identify the geographic origins of the broadcast signals and, hence, the locations of the networks and, in turn, the geographic positioning of the mobile node, positioned to receive the signals broadcast by the cellular system networks. Here, also, associations are maintained between the network operators of the networks 14-3 and 14-4, respectively, with the network operator of the WLAN 14-6. The associations are indicated by the arrows 18. And, the visited network 14-5 maintains association with the WLANs 14-2 and 14-7, here indicated by way of the lines 20. And, none of the cellular system networks maintain associations with the operator of the WLAN 14-8.

The arrows 22 represent signals broadcast by the WLANs and that are detectable by the mobile node 12. The signals broadcast by the WLANs identify the respective local area networks by their service set identifier values.

The arrows 24 are representative of signals broadcast by the cellular system networks that are also detectable by the mobile node. The cellular-system network broadcasts include the country code indications that indicate to the mobile node its geographic position.

The arrangement shown in FIG. 1 illustrates that the mobile node is positionable at a location encompassed by the coverage areas of more than one WLAN. And, when communications are to be effectuated by way of a WLAN, the mobile node must determine through which of the WLANs that the mobile node shall communicate. Communications by way of one WLAN might be preferred over another, and certain of the WLANs might not be permitted to be used through which to communicate. The preference is potentially also location-dependent, as noted previously. As the same SSID value might identify more than one WLAN, the order of preference of the WLAN might differ depending upon in which location that the WLAN is positioned when a selection is to be made.

The mobile node includes radio transceiver circuitry, here formed of a receive part 28, and a transmit part 32 that operates to communicate by way of the network part of the communication system. The mobile node further includes apparatus 34 of an embodiment of the present invention. The apparatus 34 operates to facilitate selection of with which of the WLANs that the mobile node attempts to communicate. The apparatus 34 is formed of functional entities, implementable in any desired manner, such as, for instance, by algorithms executable by processing circuitry.

The apparatus includes detectors 35 and 36 that are each coupled to the receive part 28 of the mobile node. The detector 35 operates to detect country code values contained in signals 24 broadcast by the cellular-system networks and detected at the receive part of the mobile node. And, the detector 36 operates to detect SSID (Service Set Identifier) that are contained in the signals 22 broadcast by the WLANs and detected at the receive part 28.

Indications of detections made by the detectors 35 and 36 are provided to a selector 38. The selector is thereby provided with indications both of the geographic positioning of the mobile node and the identities of the WLANs that are available, that is, in whose coverage areas that the mobile node is positioned. Lines 42 and 44 also extend to the selector 38. Lines 42 and 44 are representative of alternate manners by which the selector is provided with geographic positioning information associated with the mobile node. Inputs provided on the line 42 are provided by a GPS receiver (not shown) and inputs provided by way of the lines 44 are generated by a user interface (also not shown) in which a user of the mobile node manually inputs geographic positioning information.

The apparatus 34 further includes first, second, and third lists 46, 48, and 52, respectively. Each of the lists are formed of entries 54 identifying WLANs and their geographic areas of operation, identified by country code values in which the associated WLAN is operable. Here, the list 46 forms a home WLAN list, the list 48 forms a preferred WLAN list, and the list 52 forms a neutral WLAN list. In one implementation, separate preferred and neutral lists are maintained for each country.

When the selector is to select a WLAN through which the mobile node is to communicate, the selector first accesses the entries contained on the list 46. Entries identifying WLANs associated with country codes detected by the detector 35 are compared with the SSID values detected by the detector 36. If a match is found, a WLAN from the list 46 is selected through which to attempt to communicate. If no match is found, the same procedure is repeated with the list 48 and, if no entry is found at the list 48, the list 52 is accessed, and the selector selects a WLAN therefrom, if possible.

In the event that none of the WLANs located on any of the lists are associated with the country codes detected by the detector 35, the selector accesses a preferred roaming list (PRL) 56 that is maintained at the mobile node to identify allowable cellular-system networks with which the mobile node is permitted to communicate as the mobile node detects signals broadcast by the cellular-system network in whose coverage area that the mobile node is positioned. The mobile node is aware of the available cellular-system networks and, through the preferred roaming list, the relative order of preferences of such networks. And, as the network operators of the different networks potentially maintain associations therebetween, the selector selects a WLAN associated with a preferred cellular-system network and in whose coverage area that the mobile node is positioned by virtue of detection of the signals 22. Through appropriate operation of a user interface, suggestions are provided to the user for selection.

Thereby, a WLAN is selected by the mobile node through which to attempt to communicate. The selection is made based upon the geographic positioning of the mobile node, identified through detection of the country code broadcast by the cellular-system networks.

Figure 2:
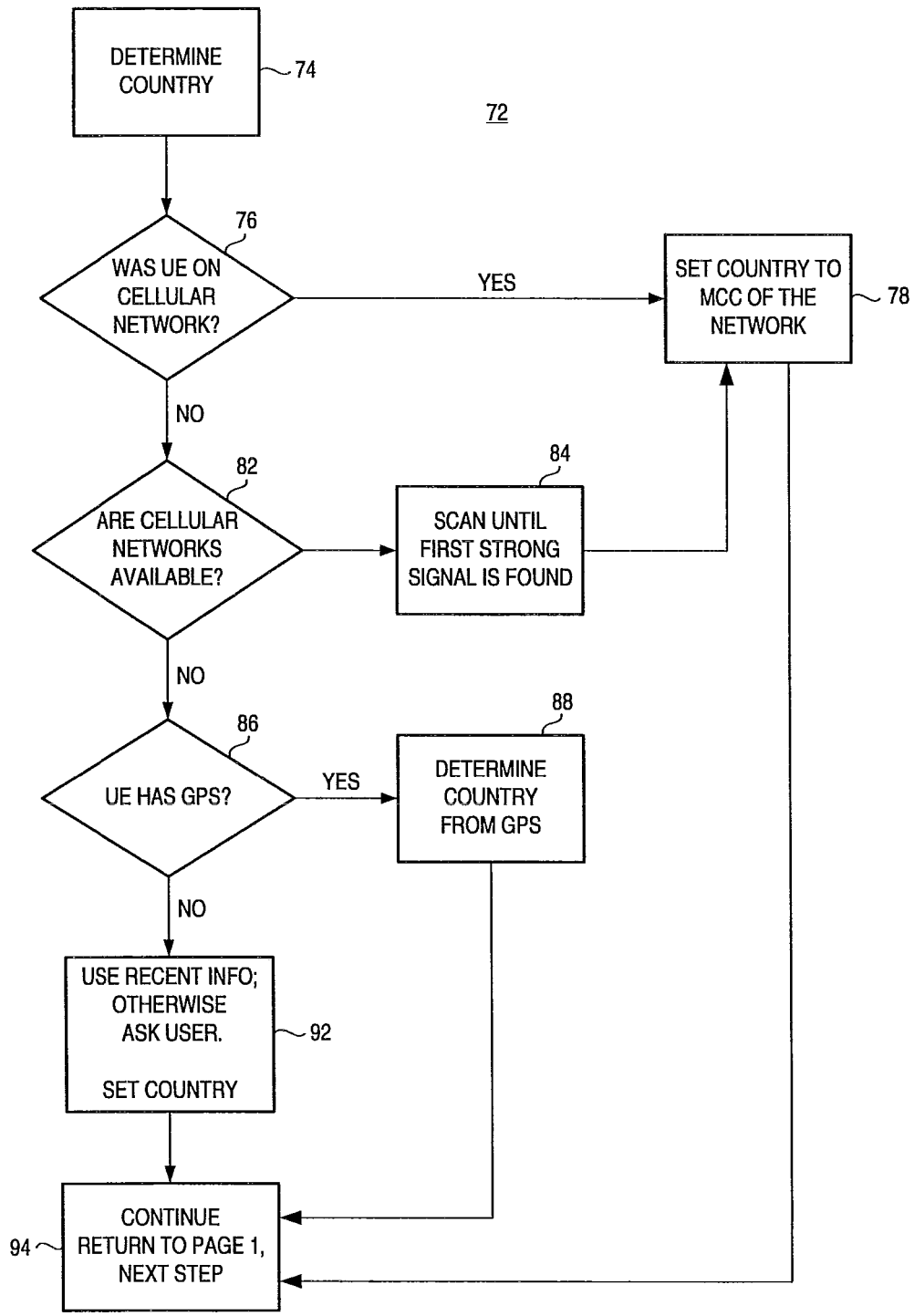
FIG. 2 illustrates a process diagram representative of exemplary operation of an embodiment of the present invention.

Turning next to FIG. 2, a process diagram, shown generally at 72, represents a manner by which a mobile node, such as the mobile node 12 shown in FIG. 1, determines its geographic positioning pursuant to operation of an embodiment of the present invention. Here, in the exemplary implementation, the country code that identifies the country that the mobile node is positioned is determined.

The process begins at the step 74 identified as "Determine Country". A determination is first made, as indicated by the decision block 76, as to whether the mobile node (identified as UE-User Equipment-in the figure) is registered with, or otherwise on a cellular-system network. If so, the yes branch is taken to the block 78, and the country code is ascertained from signals broadcast by the cellular-system network, here from the MCC (Mobile Country Code) contained in the broadcast signals that identify the country in which the cellular-system network is located.

Otherwise, the no branch is taken to the decision block 82 and a determination is made as to whether cellular-system networks are available. If so, the yes branch is taken to the block 84, and the mobile node scans channels to detect broadcasts of cellular-system signals. When a signal is found, the country code contained in the signal is ascertained and a path is taken to the block 78.

If, at the decision block 82, a determination is made that the mobile node is not positioned at an area at which the mobile node is capable of receiving cellular-system signals, the no branch is taken to the decision block 86. At the decision block 86, a determination is made as to whether the mobile node includes a GPS (Global Positioning System) receiver or otherwise is capable of obtaining GPS-like positioning information. If so, the yes branch is taken to the block 88 and the geographic position of the mobile node is determined from the GPS information.

If, the mobile node is unable to obtain GPS-like information, the no branch is taken to the block 92, and the country code information is obtained by user entry of the information by way of a user interface, or the like. Paths are taken by the block 78, 88, and 92 to the continue block 94.

Figure 3:
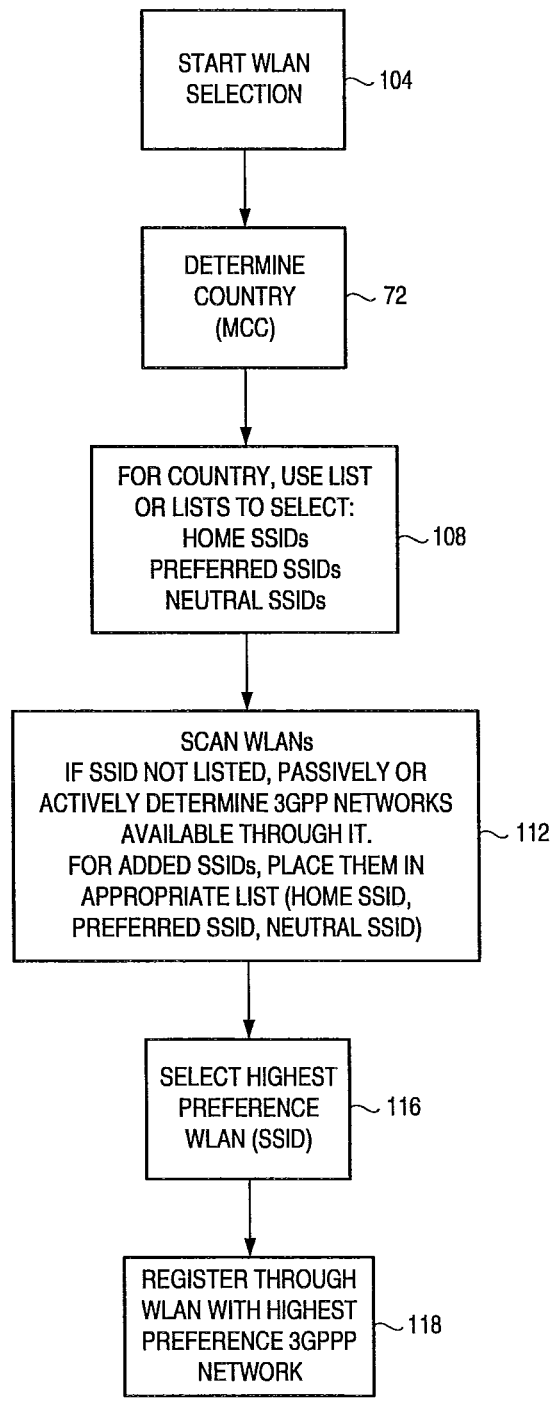
FIG. 3 illustrates a process diagram representative of operation of a further embodiment of the present invention.

FIG. 3 illustrates a process diagram, shown generally at 102, representative of additional operation of a mobile node pursuant to an embodiment of the present invention. The procedure commences at the START block 104 by which to select a WLAN through which to attempt to communicate. First, and as indicated by the block 72, the country code associated with the geographic area in which the mobile node is positioned is determined. Exemplary procedures by which to determine the country code are set forth in FIG. 2, described above.

Once the country code has been determined, a path is taken to the block 108, and lists maintained at the mobile node are accessed to attempt to select a WLAN through which to communicate. Here, three lists are maintained at the mobile node, a home list, a preferred list, and a neutral list.

A path is then taken to the block 112, and further steps are carried out in the event that the lists accessed at the operation 108 are unable to select a WLAN through which to communicate, a determination is made of which cellular-system networks, here 3GPP networks, are available through which to communicate. Associations between operators of available 3GPP networks and WLANs is ascertained. A WLAN is selected therefrom, and indications of the WLAN, together with its associated country code, is added to an appropriate list maintained at the mobile node. Thereafter, and as indicated by the block 116, a most-preferred WLAN is selected through which to attempt to communicate. And, as indicated by the block 118, the mobile node becomes registered with the selected WLAN.

Figure 4:
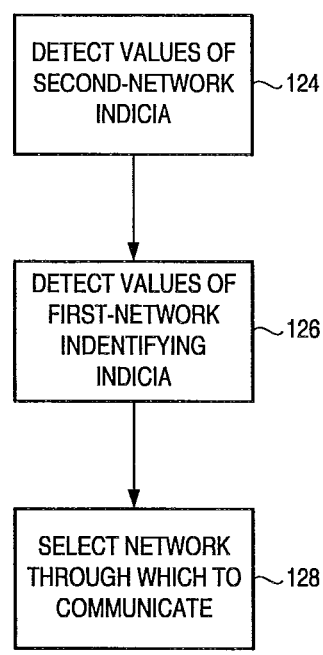
FIG. 4 illustrates a method flow diagram representative of the method of operation of an embodiment of the present invention.

FIG. 4 illustrates a method flow diagram, shown generally at 122, representative of operation of an embodiment of the present invention. The method facilitates selection of a network of a multiple network radio communication system with which a mobile node shall communicate. A network part of the communication system is formed of multiple networks including a first group of networks operable pursuant to a first communication scheme and a second group of networks pursuant to a second communication scheme.

First, and as indicated by the block 124, values of second-network indicia contained in second-network signals broadcast by at least second ones of the networks of the second group are detected. The second-network indicia identifies geographic positioning of the networks from which the second-network signals are broadcast.

And, as indicated by the block 126, values of first-network identifying indicia contained in network signals broadcast by networks of the first group are detected. The network identifying indicia identify the networks from which the signals are broadcast.

Then, and as indicated by the block 128, selection is made of which network through which to effectuate communication of data.

Through operation of an embodiment of the present invention, a WLAN is selected through which to communicate, taking into account geographic indications, even though the WLANs do not provide geographic positioning indicia to a mobile node. Improved selection is thereby possible.

The previous descriptions are of preferred examples for implementing the invention, and the scope of the invention should not necessarily be limited by this description. The scope of the present invention is defined by the following claims.

What is claimed is:

1. A method for facilitating wireless network selection, comprising:

detecting, at a user equipment (UE), a first country code from a first wireless network that operates in a first band;

maintaining a network list of second wireless networks at the UE, the network list identifying the second wireless networks and a respective associated geographic area of operation of at least one respective second wireless network of the second wireless networks, wherein the second wireless networks operate according to a technology different from a technology of the first wireless network;

detecting, at the UE, second-wireless-network-identifying information; and selecting, at the UE, a second wireless network from among the second wireless networks identified by the network list with which to communicate, the selecting made utilizing the first country code, the network list of second wireless networks and the respective associated geographic area of operation of at least the respective second wireless network, and the second-wireless-network-identifying information.

2. The method of claim 1, wherein the maintaining of the network list comprises maintaining a home wireless network list comprising entries that identify the second wireless networks and associated geographic areas of operation.

3. The method of claim 1, wherein the maintaining of the network list comprises maintaining a preferred network list comprising entries that identify the second wireless networks and associated geographic areas of operation.

4. The method of claim 1, wherein the maintaining of the network list comprises maintaining a neutral network list comprising entries that identify the second wireless networks and associated geographic areas of operation.

5. The method of claim 1, wherein the maintaining of the network list comprises maintaining a plurality of network lists, each network list of the plurality of network lists associated with a different location.

6. The method of claim 1, wherein the second wireless networks operate according to a protocol different from a protocol of the first wireless network.

7. The method of claim 1, wherein the second wireless networks identified by the network list include wireless local area networks (WLANs).

8. The method of claim 7, wherein the first wireless network is a cellular wireless network.

9. The method of claim 1, wherein the respective associated geographic area of operation identified by the network list is a country code.

10. The method of claim 1, wherein the first band is different from a second band of operation of at least one of the second wireless networks.

11. A user equipment (UE) comprising:
at least one processor; and
a non-transitory storage medium storing instructions executable on the at least one processor to:
detect a first country code received from a first wireless network, wherein the first wireless network is operable in a band different from a band of one or more second wireless networks that operate according to a second technology different from a first technology of the first wireless network;
detect second-wireless-network identifying information of a given second wireless network; and
select the given second wireless network, the selecting made utilizing the first country code and a network list of second wireless networks maintained at the UE, the network list identifying the second wireless networks and a respective associated geographic area of operation of at least one respective second wireless network of the second wireless networks.

12. The UE of claim 11, wherein the first technology is a first protocol, and the second technology is a different second protocol.

13. The UE of claim 11, wherein the first country code is a Mobile Country Code of a PLMN identity.

14. The UE of claim 11, wherein the network list of second wireless networks comprises a network list of wireless local area networks (WLANs).

15. The UE of claim 14, wherein the first wireless network is a cellular wireless network.

16. A user equipment (UE) comprising:
at least one processor; and
a non-transitory storage medium storing instructions executable on the at least one processor to:
detect a first country code from a first wireless network that operates in a first band;
maintain a network list of second wireless networks at the UE, the network list identifying the second wireless networks and a respective associated geographic area of operation of at least one respective second wireless network of the second wireless networks, wherein the second wireless networks operate according to a technology different from a technology of the first wireless network
detect second-wireless-network-identifying information of at least one second wireless network; and
select a second wireless network from among the second wireless networks identified by the network list with which to communicate, the selecting based on the first country code, the network list of second wireless networks and the respective associated geographic area of operation of at least the respective second wireless network, and the second-wireless-network-identifying information.

17. The UE of claim 16, wherein the second wireless networks identified by the network list include wireless local area networks (WLANs).

18. The UE of claim 17, wherein the first wireless network is a cellular wireless network.

19. The UE of claim 16, wherein the second wireless networks operate according to a protocol different from a protocol of the first wireless network.

20. The UE of claim 16, wherein the respective associated geographic area of operation is a country code.

* * * * *